United States Patent Office 3,012,992
Patented Dec. 12, 1961

3,012,992
POLYURETHANE CASTINGS
Kenneth A. Pigott and Bernard F. Frye, New Martinsville, W. Va., assignors to Mobay Chemical Company, Pittsburgh, Pa., a corporation of Delaware
No Drawing. Filed Mar. 25, 1959, Ser. No. 801,721
9 Claims. (Cl. 260—75)

This invention relates to a process for the preparation of improved load-bearing polyurethane elastomers.

Polyurethane elastomers have found many commercial applications, such as, automobile and truck tires, casters, shock absorption gears, and the like, because of their high abrasion resistance, high tear strength, and high surface hardness. Polyurethane elastomers with these advantageous properties have been heretofore prepared by reacting an hydroxyl polyester with diphenyl methane diisocyanate and a cross-linking agent. In this heretofore known process, the ratio of reactants has been controlled so that a balance exists between the amount of cross-linker and diisocyanate. Thus, in the heretofore known processes, if the amount of diisocyanate is increased to alter the elasticity or flexibility of the resulting polyurethane plastic, it has been heretofore considered essential to also increase the amount of cross-linking agent. If the amount of the cross-linking agent was not increased, it was heretofore supposed that the elastomeric quality of the polyurethane plastic produced would be inferior to those produced from a balanced ratio of reactants. No improvement in the load-bearing properties or compression strength of polyurethane elastomers could be predicted by increasing the amount of diphenyl methane diisocyanate. However, increasing the load-bearing or compression strength without substantial alteration of the other desirable properties of the polyurethane elastomer was necessary for many applications where higher load-bearing properties are essential, such as, for truck tires, aircraft wheels, and the like.

It is an object of this invention to provide polyurethane plastics having improved load-bearing properties and a process for the preparation thereof. Still a further object of this invention is to provide a novel polyurethane plastic.

The foregoing objects and others, which will become obvious from the following description, are accomplished in accordance with the invention, generally speaking, by providing improved load-bearing polyurethane elastomers obtained by reacting about 100 parts of an hydroxyl polyester obtained from a dihydric alcohol and a dicarboxylic acid and having an hydroxyl number of about 56, an acid number within the range of about 0.5 to about 2.0, and a molecular weight of about 2000 with about 42 to about 45 parts of diphenyl methane diisocyanate and about 18 to about 22 parts and, preferably, about 20 parts of phenylene-di-(B-oxyethylether).

Any suitable polyester obtained from the condensation of a dihydric alcohol and a dicarboxylic acid and having an hydroxyl number of about 56, an acid number within the range of about 0.5 to about 2.0, and a molecular weight of about 2000 may be used. Any suitable dihydric alcohols or mixtures thereof may be used, such as, for example, ethylene glycol, diethylene glycol, 1,2-propylene glycol, 1,3-butylene glycol, and 1,4-butylene glycol. Any suitable dicarboxylic acids or mixtures thereof may be used, such as, for example, adipic acid, succinic acid, sebacic acid, and phthalic acid. It is also possible to use the anhydrides of the dihydric alcohols and dicarboxylic acids, such as, for example, ethylene oxide and phthalic anhydride if sufficient reactive hydrogen-containing compound is included in the condensation mixture to initiate the chain-lengthening reaction.

Any suitable phenylene-di-(B-oxyethylether) may be utilized as the cross-linking agent or chain extender in accordance with this invention, but it is preferred to use para-phenylene-di-(B-oxyethylether). Other suitable phenylene-di-(B-oxyethylethers) include isomers and alkyl-substituted products, such as, for example, meta-phenylene-di-(B-oxyethylether), ortho-phenylene-di-(B-oxyethylether), methyl-p-phenylene-di-(B-oxyethylether), and the like. These cross-linking agents may be used alone or in admixture with each other.

The invention is based on a study of molar excesses of isocyanate in the production of polyurethane elastomers. The data given below in Table 1 illustrate the effect of altering the excess of isocyanate in a castable mixture used for the preparation of polyurethane elastomers. The results indicated in the table were obtained by combining the varying amounts of diphenyl methane diisocyanate with 100 parts of an ethylene glycol-adipic acid polyester and 20 parts of para-phenylene-di-(B-oxyethylether).

TABLE 1

| Parts of Diphenyl Methane Diisocyanate | Load, lbs./sq. in. | Percent Deflection |
|---|---|---|
| 40 | 450 | 10 |
| 42 | 590 | 10 |
| 45 | 560 | 10 |

Thus, as shown in Table 1, the load required to produce a ten percent deflection in the elastomers obtained by using 40 parts of diphenyl methane diisocyanate is considerably lower than the load required to produce the same deflection when 42 parts of diphenyl methane diisocyanate are used. The compression strength or load-bearing capacity of the polyurethane elastomers produced from about 42 to about 45 parts of diphenyl methane diisocyanate in the above-described reaction vary only slightly. The load-bearing capacity of the elastomers will be decreased by using more than 45 parts of diphenyl methane diisocyanate.

The higher load-bearing polyurethane elastomers of this invention are useful in many commerical applications, such as, for automobile tires, casters for various types of load-carrying trucks, rubber-like mallets, and the like. Due to their higher load-bearing capacity, they may also be used for solid aircraft wheels and the like.

The invention is illustrated, without being limited thereto, by the following examples, the parts being by weight.

Example 1

About 100 parts of a polyester obtained from the thermal esterification of adipic acid and ethylene glycol and having an OH number of about 56 and an acid number of approximately 1 was heated to about 145° C. and mixed with about 40 parts of diphenyl methane diisocyanate which had been previously heated to about 50° C. This mixture was allowed to react for about 25 minutes under a partial vacuum. To the resultant product was added about 20 parts of para-phenylene-di-(B-oxyethylether). The mixture was then poured into molds at 110° C. and allowed to cure for about 24 hours at about 110° C. The resulting polymer had the following physical properties:

*Compression Deflection*

| Load (lbs./sq. in.) | Deflection (percent) |
| --- | --- |
| 80 | 2 |
| 185 | 4 |
| 275 | 6 |
| 360 | 8 |
| 450 | 10 |
| 960 | 20 |

Tensile strength, lbs./sq. in. _____ 5000
Elongation, percent _____ 550
Tear strength, lbs./sq. in. _____ 450
300% Modulus, lbs./sq. in. _____ 2400

*Example 2*

A polymer made as in Example 1, but with 42.5 parts of diphenyl methane diisocyanate had the following physical properties:

*Compression Deflection*

| Load (lbs./sq. in.) | Deflection (percent) |
| --- | --- |
| 105 | 2 |
| 250 | 4 |
| 380 | 6 |
| 410 | 8 |
| 590 | 10 |
| 1,185 | 20 |

Tensile strength, lbs./sq. in. _____ 5100
Elongation, percent _____ 550
Tear strength, lbs./sq. in. _____ 485
300% Modulus, lbs./sq. in. _____ 2600

It is to be understood that any of the other phenylene-di-(B-oxyethylether) compounds described herein can be substituted for the one used in the preceding examples. Moreover, any other suitable reactant may be substituted for any one of those specified in the examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for making a polyurethane elastomer which comprises reacting 100 parts of an hydroxyl polyester obtained by the condensation of a dihydric alcohol with a dicarboxylic acid and having an hydroxyl number of about 56, an acid number of about 0.5 to about 2.0, and a molecular weight of about 2000 with 42 to 45 parts of diphenyl methane diisocyanate and 18 to 22 parts of a phenylene-di-(B-oxyethylether), said parts being by weight.

2. A product prepared by the process of claim 1.

3. The process of claim 1, wherein said dicarboxylic acid is adipic acid.

4. The process of claim 1, wherein said dicarboxylic acid is succinic acid.

5. The process of claim 1, wherein said dihydric alcohol is ethylene glycol.

6. The process of claim 1, wherein said dihydric alcohol is ethylene glycol and said dicarboxylic acid is adipic acid.

7. The process of claim 1, wherein said dihydric alcohol is ethylene glycol and said dicarboxylic acid is succinic acid.

8. The process of claim 1, wherein said phenylene-di-(B-oxyethylether) is para-phenylene-di-(B-oxyethylether).

9. A process for making a polyurethane elastomer which comprises reacting 100 parts of an hydroxyl polyester obtained by the condensation of a dihydric alcohol with a dicarboxylic acid and having an hydroxyl number of about 56, an acid number of about 0.5 to about 2.0, and a molecular weight of about 2000 with 42 to 45 parts of diphenyl methane diisocyanate and about 20 parts of a phenylene-di-(B-oxyethylether), said parts being by weight.

References Cited in the file of this patent

UNITED STATES PATENTS

| 2,729,618 | Muller et al. | Jan. 3, 1956 |
| 2,816,972 | Muller et al. | Nov. 25, 1958 |

FOREIGN PATENTS

| 1,029,559 | Germany | May 8, 1958 |
| | (KL 39b 22/04) | |

OTHER REFERENCES

Bayer, Angewandte Chemie, 59, 257–272 (1947).